April 10, 1951      R. D. THORN      2,548,080
CARRYING BELT FOR FISH LURES
Filed Dec. 7, 1945      2 Sheets—Sheet 1
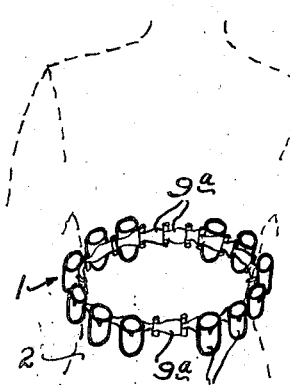
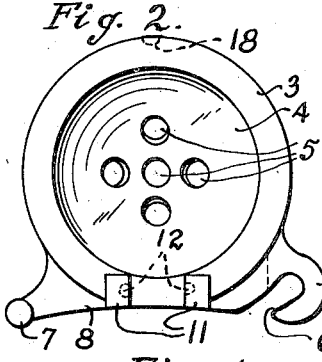
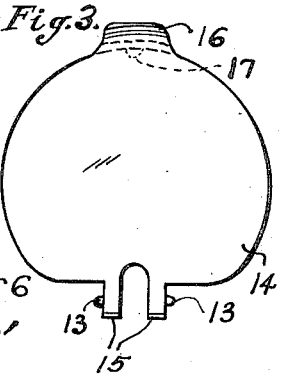
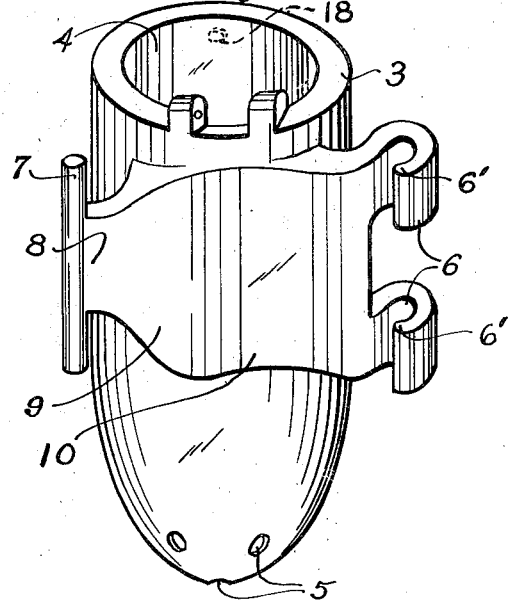
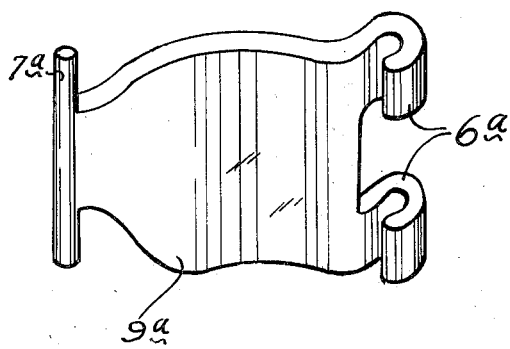
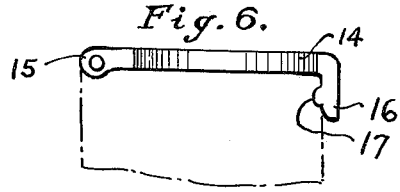
Ryder D. Thorn
INVENTOR.
BY Wayland D. Keith
HIS AGENT.

April 10, 1951    R. D. THORN    2,548,080
CARRYING BELT FOR FISH LURES
Filed Dec. 7, 1945    2 Sheets-Sheet 2
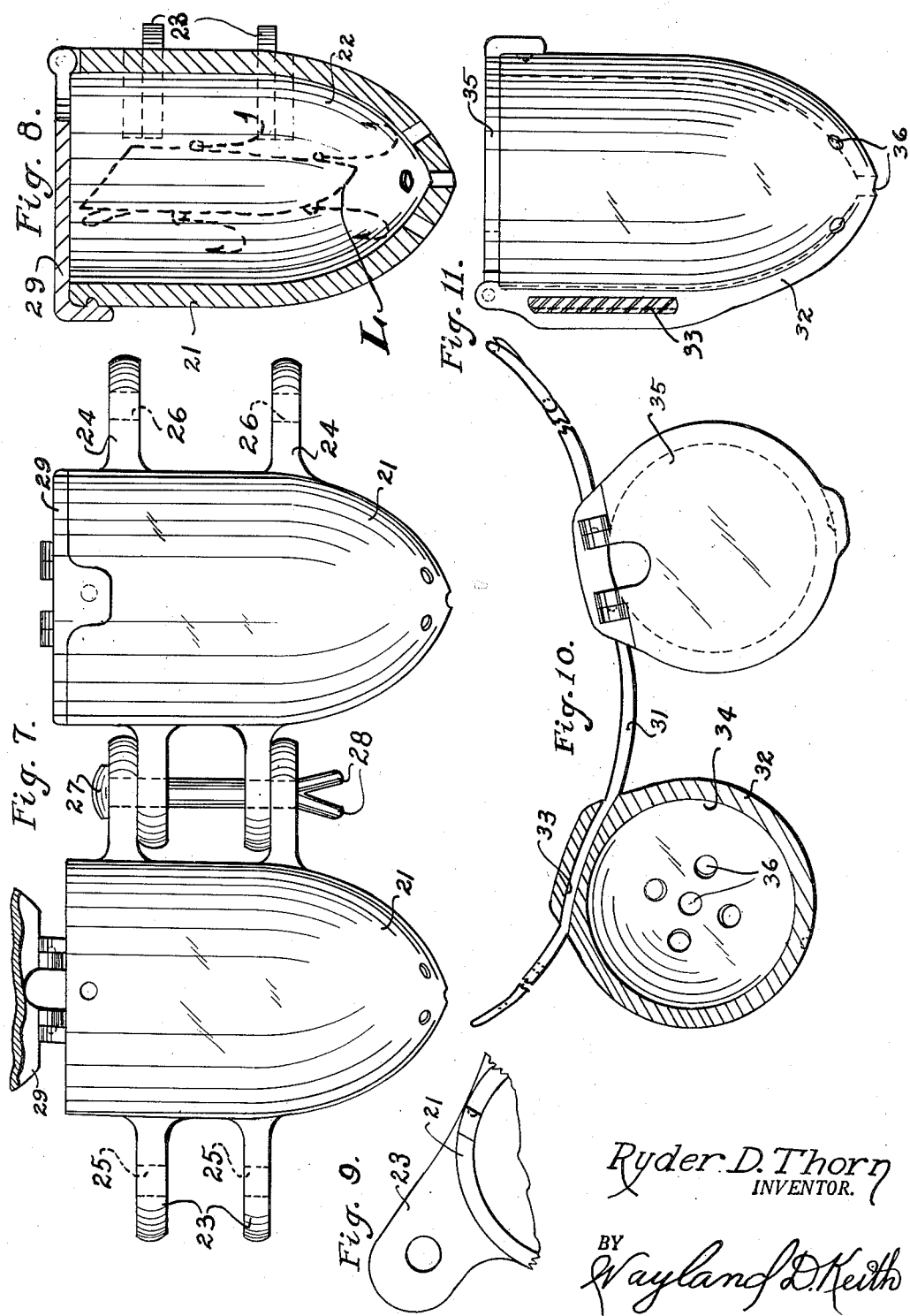

Patented Apr. 10, 1951

2,548,080

UNITED STATES PATENT OFFICE 2,548,080

CARRYING BELT FOR FISH LURES

Ryder D. Thorn, Wichita Falls, Tex.

Application December 7, 1945, Serial No. 633,320

5 Claims. (Cl. 224—5)

1

This invention relates to improvements in fisherman's belts and more particularly to belts which may be arranged to form a series of transparent receptacles in which to carry equipment used by fishermen and particularly fish lures.

Belts for this general purpose have been provided heretofore, but these for the most part have been inadequate, inasmuch as the fish hooks were not protected from catching in the container and the fisherman was not protected from injury while taking out or putting back hooks when he could not see how they are positioned, nor his person protected from them while wearing the belt, neither could the fisherman see and select the lure desired without removing them from the belt to see what he had with him.

The primary object of the present invention is to provide a fish lure belt having a multiplicity of transparent containers in which to carry the lures and to protect the fisherman against injury from the hooks and to permit visual inspection and selection of a lure without the necessity of removing them from the compartment and which compartments are provided with drains so that the used lures that are placed therein will dry while in the container.

Another object of this invention is to provide a fish lure belt made up of a multiplicity of individual containers that are readily assembled and made up of the desired number of containers without requiring any special tools, and yet provide a belt which is flexible and which will conform to the body of the wearer.

These objects and others that will manifest themselves as the description proceeds are illustrated in the accompanying drawings in which:

Fig. 1 is a diagrammatic view of one form of the belt assembled and in position about the person of the wearer, indicated in dotted outline;

Fig. 2 is a top plan view of the device with the cover removed therefrom;

Fig. 3 is a top plan view of the container cover as removed therefrom;

Fig. 4 is a perspective view of the inner portion of one of the lure receiving receptacles, showing the details of construction of the hook and pin connecting means;

Fig. 5 is a view of a spacer or connecting attachment link to be substituted in the belt for fish lure containers;

Fig. 6 is a side view of the lid for one of the containers showing the position of the lid on the container when closed;

Fig. 7 is a front elevational view of a portion of a modified form of the invention showing one of

2 the containers with the cover in open position and one with the cover in closed position, and having parts broken away and shown in section to illustrate the details of construction;

Fig. 8 is a central vertical sectional view through one of the containers showing the manner in which the hinged cover and latch operate;

Fig. 9 is a fragmentary portion of a plan view of the form of the invention as shown in Figs. 7 and 8;

Fig. 10 is a top plan view of a modified form of the invention with one of the containers shown in section to illustrate the details of construction; and Fig. 11 is a vertical sectional view taken through the belt and showing one of the containers as illustrated in Fig. 10 in elevation.

With more detailed reference to the drawing the numeral 1 generally designates the assembled fish lure belt which belt is to be positioned about the human body indicated as 2. A transparent shell is formed with an inwardly and downwardly converging lower end having holes 5 therein so that water which collects in the cavity 4 formed by the shell, will drain therefrom. The shell 3 is of such size as to provide a cavity of suitable size to contain fish lures. The shell 3 has a pair of hooks 6 formed on one side thereof and a bar 7 formed on the other side to be complemented by similarly formed hooks 6 and bar 7 on an adjacent shell. The bar 7 is preferably formed integral with a neck 8 which protrudes outwardly from shell 3. It is also preferable to form the hooks 6 and neck 8 integral with the shell and of the same material, but it is to be understood that these may be made separate and form a unit similar to the link belt unit as shown in Fig. 5.

A link 9 is formed integral with the shell and has the inner surface thereof, designated as 10, curved so that it will conform to the curve of the human body and thus be more comfortable to the wearer.

The link 9a, as shown in Fig. 5, may have hooks 6a and bar 7a formed substantially like the link 9 but without the receptacle, so that the belt may be made the proper length to fit snugly about the body of the fisherman, and only the desired number of receptacles used, as shown in Fig. 1.

The hooks 6 are formed with arcuate inner surfaces and with the nose 6' of the hook constricted so that in order to fasten bar 7 thereinto a slight force will be necessary causing the nose 6' to yield sufficiently to permit the entrance of the bar 7, but the hook is sufficiently resilient so that the nose 6' will spring back into normal position and hold the bar against accidental dis-assembly. In this manner any number of shells 3 and links 9a may be assembled into a belt of the proper length to fit about the waist of the wearer.

The shell 3 has spaced ears 11 formed on the upper and inner end thereof. The inner surfaces of these ears 11 have indentures 12 therein to receive pivotal projections 13 of transparent cover 14. The transparent cover 14 has outwardly projecting ears 15 which have sufficient resilience to be pressed inward to pass within openings formed between the ears 11 so that the pivotal projections 13 will engage indentures 12 on the inner surfaces of ears 11, thus hingeably securing the cover 14 in place on shell 3. The projection 15 on transparent cover 14 will spring outward so as to form a pivotal connection to permit said cover to be opened and closed.

The front of transparent cover 14 has a downwardly turned projection 16 which has a raised portion 17 on the inner surface thereof, which raised portion is adapted to engage a recess 18 formed in the front of shell 3. The projection 16 has sufficient resiliency to permit it to spring outward and the raised portion 17 to snap into recess 18 so as to fasten the cover 14 to prevent accidental loss of the fish lures contained therein.

In the assembly and use of the fishing belt, a sufficient number of shells or containers 3 are assembled by interengaging hook 6 of one container with bar 7 of the adjacent container until the desired number of containers are assembled. If it is not desired to have a continuous arrangement of containers to go entirely around the body of the wearer, intervening spaces may be filled in with links 9a as shown in Figs. 1 and 5. The shells or containers 3 have transparent covers 14 hingeably secured to the upper ends thereof so they may be readily opened to take out or insert the fish lures, and by having both shell and cover transparent, the fisherman may visually select the lure desired without the necessity of opening the cover, and by being able to see the position of the hook, can take it out without injury to his hands. By this arrangement the selection of the lure is expedited, and having a visual display of the lures at all times the fisherman is constantly reminded of the particular lures available to him.

The form of the invention as shown in Fig. 7 has a transparent shell 21 similar in shape to the shell 3 and has a cavity 22 formed therein to receive the fish lure as indicated at L in dotted outlines, Fig. 8. The form of the invention as shown in Figs. 7 and 8 has ears 23 on one side of the shell 21 adapted to interengage complementary ears 24 positioned on the opposite side of a similarly formed member. The ears 23 have holes 25 therethrough and the ears 24 have holes 26 therethrough and when in interengagement the respective holes of the ears are in position to receive bifurcated pin 27. The bifurcation 28 of pin 27 is adapted to pass through holes 25 and 26 and to spring outward, as indicated in Fig. 7 so as to prevent accidental loss of the pin and to prevent the belt from becoming disassembled.

The shell 21 has transparent cover 29 hingeably mounted thereon. It is preferable to have the inner surfaces of the ears 23 and 24 curved so as to conform to the curves of the human body and thus make the belt more comfortable.

The form of the invention as shown in Figs. 7 and 8 may be joined together to form a belt similar to that shown in Fig. 1 and the manner of use will likewise be similar.

In the form of the invention as shown in Figs. 10 and 11 a belt 31 which may be of leather, flexible plastic composition, canvas, or other suitable material may have transparent shells 32 slidably fitted thereon. A slot 33 is formed through the rear portion of the shell 32 to receive the belt 31 therethrough. This slot is preferably of an inverse curve to that of the human body, or it may be straight, so that the belt when drawn around the body of the wearer will cause the shell 32 to frictionally engage the belt and prevent slippage.

The shell 32 has a cavity 34 formed therein and has a transparent cover 35 hingeably connected to the shell in a manner similar to the other forms described. Openings 36 are provided in the lower end of the bullet shaped body so as to drain the water therefrom that may collect therein.

In the form of the invention as shown in Figs. 10 and 11 there is provided a conventional belt having a buckle on one end thereof and a plurality of eyes on the other so that the belt may be adjusted to fit the wearer. The desired number of shells or lure containers may be threaded on the belt so as to form a series of transparent receptacles in which to carry fishing lures.

In the form of the invention shown in Figs. 1-5 and the two modifications thereof, it is to be pointed out that both the shell and the cover are transparent and that the shells are of the proper size and shape to contain the fishing lure as used by fishermen and that the cover is hinged and adapted to latch in closed position to prevent the loss of lures, and that the receptacle will protect the wearer of the belt against injury from fish hooks. The number of containers used is optional, and the visual selection of the lure is possible without the necessity of opening the container or removing the contents in order to make such selection. The belt with the containers thereon is neat in appearance, not cumbersome to wear, and with the containers in upright position, the water will drain from the lures without the necessity of manually drying each lure after it has been used.

Having thus described the invention, what is claimed is:

1. A fish lure carrying member adapted to encircle the human body, comprising a plurality of interconnecting transparent receptacles, a transparent hinged cover closing the upper end of each receptacle, each of said receptacles having a downwardly and inwardly convergent bottom portion and a curved vertically disposed wall section, the bottom of each of said receptacles having a drainage opening therethrough, and means connecting said receptacles to form a substantially continuously curved body-engaging portion on said member adapted to fit against the body.

2. A fish lure carrying belt adapted to encircle the human body comprising a series of interconnecting members, some of said members being in the form of transparent elongated substantially cylindrical receptacles adapted to receive fish lures, said receptacles having downwardly convergent perforated bottom portions and vertically disposed curved wall sections, transparent covers hingeably mounted at the upper ends of said receptacles adapted to form closures therefor, horizontally extending connecting means on each of said receptacles and means opposite said connecting means adapted to engage the connecting means on an adjacent receptacle, spacing means interposed between said receptacles, said spacing means being provided with connecting elements complementary to the connecting means on said receptacles and having vertically disposed curved wall sections, said wall sections of said receptacles and said spacing means forming a substantially continuously curved surface on said belt adapted to fit against the body.

3. In a fish lure carrying belt adapted to encircle the human body a plurality of interconnecting receptacles in the form of transparent elongated substantially cylindrical receptacles each having a downwardly convergent perforated bottom portion and an open top, each of said receptacles having a curved vertically disposed wall section, said receptacles being adapted to receive fish lures, horizontally extending hook means on each of said receptacles and means opposite said hook means adapted to engage hook means on an adjacent receptacle, said curved wall sections of said receptacles forming a substantially continuously curved body-engaging portion on said belt adapted to fit against the body.

4. A fish lure carrying belt adapted to encircle the human body comprising interconnecting members in the form of elongated substantially cylindrical receptacles adapted to receive fish lures, each of said receptacles having a downwardly convergent perforated bottom portion and a vertically disposed curved wall section, said curved wall sections forming a substantially continuously curved portion on said belt adapted to fit against the body, complementary connecting means extending from opposite sides of each of said receptacles, said connecting means on one of said sides being adapted for overlapping arrangement with the complementary means on the adjacent receptacle, and a connecting member securing said means in overlapping relation between adjacent receptacles.

5. In a fish lure carrying belt adapted to encircle the human body a plurality of interconnecting members, some of said members being in the form of transparent elongated substantially cylindrical receptacles having downwardly convergent perforated bottoms and curved vertically disposed wall sections, said receptacles being adapted to receive fish lures, link members connecting said receptacles, said link members having curved vertically disposed wall sections, all of said members having horizontally extending hook means and means opposite said hook means adapted to engage said hook means on an adjacent member, said curved wall sections of said members forming a substantially continuously curved body-engaging member adapted to fit against the body.

RYDER D. THORN.

REFERENCES CITED

The following references are of record in the file of this patent:

UNITED STATES PATENTS

| Number | Name | Date |
|---|---|---|
| D. 35,670 | Eustis | Feb. 4, 1902 |
| 353,022 | Deland | Nov. 23, 1886 |
| 1,128,205 | White | Feb. 9, 1915 |
| 1,173,427 | Heyman | Feb. 29, 1916 |
| 1,484,399 | Kroha | Feb. 19, 1924 |
| 1,486,470 | Welch | Mar. 11, 1924 |
| 1,532,614 | Waibel | Apr. 7, 1925 |
| 1,549,400 | Wimler | Aug. 11, 1925 |
| 1,574,416 | Campbell | Feb. 23, 1926 |
| 1,714,732 | Schneider | May 28, 1929 |
| 2,051,136 | Dormire | Aug. 18, 1936 |
| 2,098,636 | Smith et al. | Nov. 9, 1937 |
| 2,133,884 | Barrett | Oct. 18, 1938 |
| 2,292,709 | McCann | Aug. 11, 1942 |
| 2,399,904 | Baucum | May 7, 1946 |
| 2,438,841 | Casalino | Mar. 30, 1948 |

FOREIGN PATENTS

| Number | Country | Date |
|---|---|---|
| 459,631 | Great Britain | Jan. 12, 1937 |

OTHER REFERENCES

Catalog issued by Bill Dewitt Baits of Auburn N. Y., page 6. (Copy in Div. 2.)